United States Patent [19]

Giza

[11] Patent Number: 4,959,000
[45] Date of Patent: Sep. 25, 1990

[54] RETRACTABLE PIN MOLD

[75] Inventor: John P. Giza, Acushnet, Mass.

[73] Assignee: Acushnet Company, New Bedford, Mass.

[21] Appl. No.: 429,522

[22] Filed: Oct. 31, 1989

[51] Int. Cl.⁵ .................... B29C 45/14; B29C 45/36; B29C 45/72
[52] U.S. Cl. .................... 425/116; 264/275; 425/127; 425/129.1; 425/549; 425/562; 425/570; 425/572
[58] Field of Search ................ 264/275; 425/110, 116, 425/117, 127, 562, 570, 572, 577, 549, 233

[56] References Cited

U.S. PATENT DOCUMENTS

| 721,462 | 2/1903 | Richards | 264/275 |
| 2,361,348 | 10/1944 | Dickson et al. | 425/116 |
| 2,376,085 | 5/1945 | Radford et al. | 425/116 |

FOREIGN PATENT DOCUMENTS 88199615 8/1988 Japan .

Primary Examiner—Willard Hoag
Attorney, Agent, or Firm—Lucas & Just

[57] ABSTRACT

An improved retractable pin mold for golf balls has a gate valve positioned at the pole of the core.

2 Claims, 2 Drawing Sheets

RETRACTABLE PIN MOLD

This invention relates to golf balls and, more particularly, to an improved retractable pin mold for golf balls.

Conventionally, golf ball covers are made by either compression molding two preformed half shells about a core or by injection molding of fluid cover stock material about a core. Injection molding uses a mold equipped with retractable pins that hold the core in place while the fluid cover stock fills the void between the core and the inside wall of the mold. After the fluid ceases to enter the mold but before the cover stock has completely hardened, the retractable pins are withdrawn while the fluid cover stock is still able to flow and fill the voids left by the pins. Conventionally, the core is either a solid one-piece mass of material or a wound core which comprises a center around which thin elastic thread has been wrapped. Typically, a solid core is used.

In a conventional retractable pin mold used for golf balls a series of conduits transport the fluid cover stock material to the individual mold cavity. These conduits are referred to as runners and are typically uninsulated. The fluid cover stock material travels through the cold runners and passes into the mold cavity through a series of ports, referred to as gates, which are positioned at the mold parting line. Air inside the mold cavity is displaced by the incoming fluid cover stock and leaves the mold cavity through the bushing around the retractable pins. The retractable pins center the core in the mold cavity and position the core in a generally vertical plane.

Conventionally, the fluid cover stock material enters the mold cavity in a horizontal plane and exerts forces on the core in the horizontal plane. The core must be centered in the finished ball since cores that are off-center produce an unplayable ball. This means that the flow of cover stock through the gates and the position of the gates around the mold cavity must be balanced to maintain equal and opposite force against the core so as not to move the core off center. Additionally, the retractable pins must be able to resist force from a horizontal direction even though the pins are positioned generally in a vertical plane. The horizontal forces exerted on the pins due to the horizontal direction of movement of the incoming fluid cover stock material tend to cause substantial wear to the pins and pin bushings. Such damages to the pins cause pin flash and pin marks in the finished ball, both of which are undesirable in a high-quality golf ball. This wear on the pins and pin bushings creates a need to replace pins and bushings after a period of time. This repair in turn leads to downtime with the molds.

In conventional retractable pin molds, the vertically oriented pins detract from the cosmetic quality of the ball. When the pin is withdrawn, the head of the pin typically forms one of the dimples in the cover. Thus, the shape of the head of the pin determines the shape of the dimple. Since pins conventionally enter the cavity in a generally vertical plane, in order to have a good grip on the spherical surface of the core the head of each pin is cut on an angle comparable to the tangent line on the surface of the core at the point of contact between the pin head and the core. The dimple formed by the head of the pin is elliptical because the head of the pin is elliptical, pins being generally circular in cross-section. Normal dimples are substantially spherical in shape. The elliptical dimples formed by the head of the pin are out of place and provide a cosmetically poor ball.

Conventional retractable pin molds face another problem, that being balancing the flow of fluid through the gates in each individual cavity in a multi-cavity mold frame. The flow must be balanced so that the cores are not shifted off-center. Additionally, the overall flow of fluid to each cavity through the runners must be balanced so that the timing for retracting the pins from each cavity in a mold is the same. If the pins are retracted too soon, the core tends to shift off of center and produce an unacceptable ball. If retracted too late, the pins leave a hole in the ball since the cover stock is no longer fluid enough to back-fill the hole; this is also unacceptable for a high-quality golf ball Timing for retraction of the pins from the mold cavity is thus critical.

In the conventional cold runner, retractable pin system used for golf balls, the balls must be cut from the runner system after molding and the gate vestiges must be machined off of the golf ball.

A new retractable pin mold for golf balls has now been discovered which alleviates a number of the problems of conventional golf ball retractable pin molds. The mold of the present invention positions gates at each pole of each mold cavity. This makes balancing less critical and reduces shifting of cores during molding operations. Additionally, it reduces wear and splay of the retractable pins.

The mold of the present invention also employs a valve positioned at each gate to allow an increase in the flow of cover stock into the mold cavity and to reduce fill time. These valves also reduce the amount of machining of the gate vestiges.

Further, the retractable pin mold of the present invention positions the retractable pins in a non-vertical plane such that the pins are normal to the surface of both the core and the ball cover. This allows the pin to form a spherical dimple in the cover rather than the elliptical dimple left by conventional retractable pin molds.

Additionally, the retractable pin mold of the present invention uses a hot runner system thereby eliminating the need to machine or grind off gate vestiges which were left by the cold runner system.

The improved retractable pin mold of the present invention comprises a mold frame having a top mold plate and a bottom mold plate, said top mold plate having a plurality of top half molds therein and said bottom mold plate having a plurality of bottom half molds therein, one of each of said top half molds in registration with one of each of said bottom half molds, said top half mold and said bottom half mold forming a substantially spherically shaped mold cavity, said top half mold and said bottom half mold joining at the equator of the spherically shaped mold cavity, the improvement comprising:

a gate positioned at the pole of each top half mold and at the pole of each bottom half mold; and a valve at each gate to control the flow of fluid into each spherically shaped mold cavity.

No gates are positioned at the equator of the spherical mold cavity.

There are only two gates for each spherically shaped mold cavity, a top gate positioned in the top half mold and a bottom gate positioned in the bottom half mold. The top gate is positioned at the top pole of the spherically shaped mold cavity and the bottom gate is positioned at the bottom pole of the spherically shaped mold cavity.

Preferably, the runners to each of the gates are heated such that there is minimal loss of fluid cover stock due to waste.

Preferably, the axis of the retractable pin is substantially normal to the tangent line of the surface of the core and the ball at the point where the pin makes contact with the core and the surface of the ball.

These and other aspects of the present invention may be more fully understood by reference to the accompanying drawings.

BRIEF DESCRIPTION OF THE DRAWINGS

FIG. 1 illustrates conventional molded golf balls from a retractable pin mold and specifically shows golf balls 10 and 12 which are taken from a conventional retractable pin golf ball injection mold having eight cavities. Opposite equator 14 of golf ball 10 are gates 20, 22, 24, 26, 28 and 30. Runner 32 is connected to each gate 20, 22, 24, 26, 28 and 30. Top pole 40 of golf ball 12 is shown.

FIG. 2 is a side view of the retractable pin mold of the present invention showing a portion of mold frame 100 divided into top mold plate 102 and bottom mold plate 104. The two mold plates join at parting line 106. Stops 108 ensure that a small gap is maintained between the two mold plates to allow for air to escape from the mold cavity. Conventional cover stock formed of ionomeric resin cannot pass through a gap of less than about 0.0025 inches (0.0065 cm). Thus, the mold plates are spaced about 0.0015 to about 0.0025 inches (0.0035-0.0065 cm) or less apart to allow air to escape but to prevent the cover stock from escaping. Such a gap only leaves a witness line along the equator rather than a band of cover stock that needs to be buffed from the ball.

Located in top mold plate 102 are top half molds 110 and 112. In bottom mold plate 104 are bottom half molds 114 and 116. The respective half molds 110, 114 and 112, 116 are in registration and form substantially spherical mold cavities 120 and 122, respectively. The spherical cavities 120, 122 have an equator along parting line 106 which is shown in dashes passing through both. Located in cavities 120 and 122 are golf ball cores 124 and 126, respectively. The inside walls of spherical cavities 120 and 122 are patterned with a dimple design. Associated with each half mold 110, 112, 114 and 116 is a set of at least three retractable pin assemblies. FIG. 2 shows only one such assembly, 130, 132, 134, 136 respectively.

As shown in FIG. 3, half mold 140 preferably has retractable pin assemblies therein. The heads of the preferred five retractable pins 142 are shown, each offset from the adjacent one by about 72°. The base of gate valve 148 is also shown at the pole of half mold 140.

Figure 1:
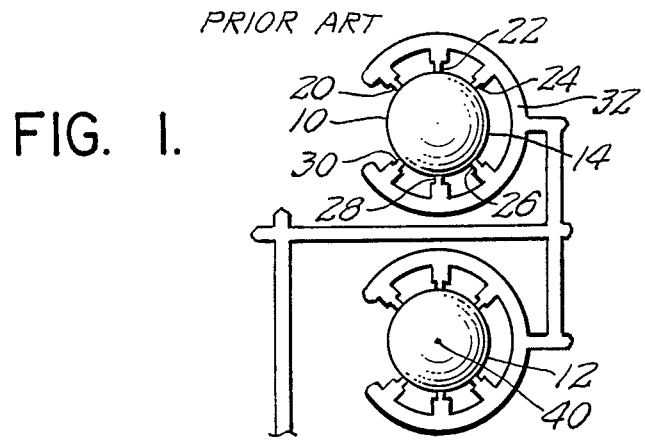
FIG. 1 illustrates golf balls from a conventional injection molding operation with a cold runner system.
Figure 2:
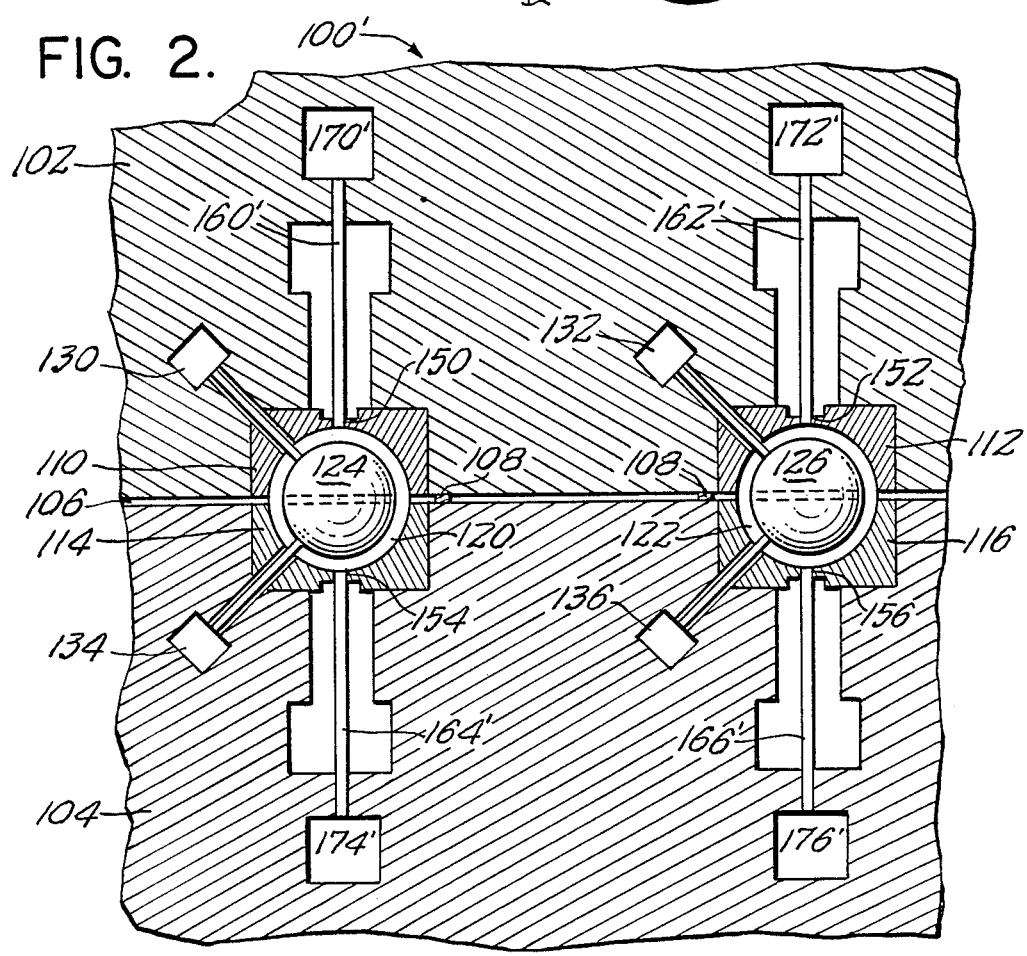
FIG. 2 illustrates a side view of the retractable pin mold of the present invention.
Figure 3:
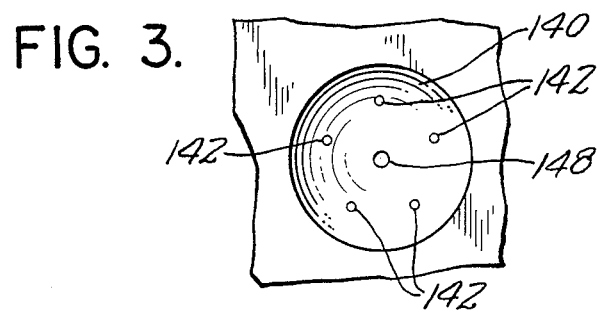
FIG. 3 illustrates an inside view of a half mold.

Returning to FIG. 2, half molds 110, 112, 114 and 116 have gates 150, 152, 154 and 156, respectively. Gates 150, 152, 154 and 156 have gate valves 160', 162', 164' and 166', respectively, and activating means 170', 172', 174' and 176', respectively, for effecting movement of the gate valve.

The gates 150 and 152 are located at the top pole of cores 124 and 126, respectively, and gates 154 and 156 are located at the bottom pole of cores 124 and 126, respectively.

The position of gate 150 means that the force of fluid cover stock entering spherical cavity 120 and surrounding core 124 will be opposed directly by the flow of cover stock through gate 154.

Valve gate pin 160' will allow little additional cover stock to be connected to the cover formed around the top half of core 124.

Figure 4:
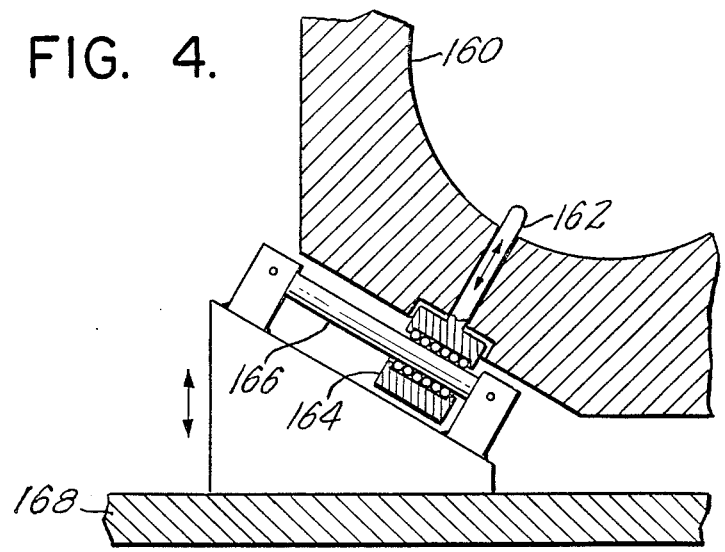
FIG. 4 illustrates a preferred retractable pin in accordance with the present invention.

FIG. 4 illustrates the preferred retractable pin in accordance with the present invention. A section of ball cavity 160 is shown with pin 162 extending therethrough. Pin 162 extends into the ball cavity at an angle normal to the surface of the ball. The end of pin 162 which extends into the ball cavity is shaped to form a dimple in the surface of the finished golf ball. Attached to the other end of pin 162 is ball bushing 164. Ball bushing 164 is able to travel on shaft 166. Shaft 166 is connected to plate 168. The movement of pin 162 and plate 168 is illustrated by arrows in FIG. 4. It will be understood that plate 168 is connected to all pins in the mold plate in which it is positioned. This allows all pins in the mold plate to be retracted simultaneously. It is also possible to use stoppers for the plate in order to use cores of different sizes in the golf balls.

Figure 5:
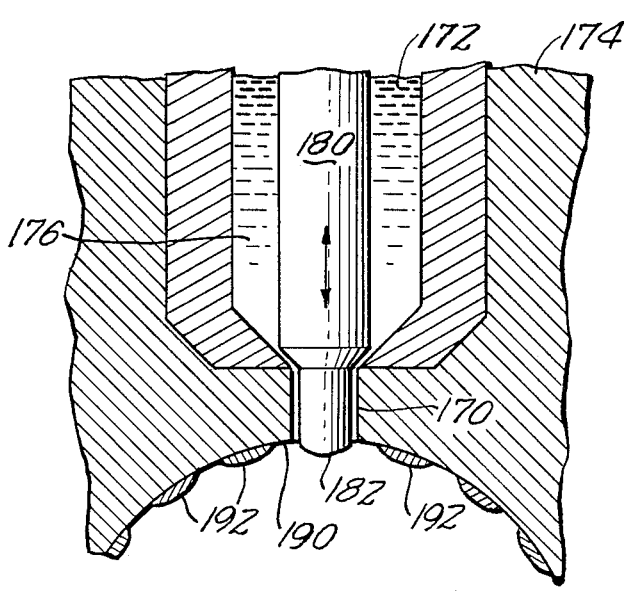
FIG. 5 illustrates the preferred gate valve arrangement.

FIG. 5 illustrates the preferred end of the valve at the gate in accordance with the present invention. Gate 170 is shown with passage 172 which connects to the runners. Passage 172 has a conventional electric heating element 174 to maintain the cover stock material 176 in a fluid state. Pin 180 extends through passage 172 and into gate 170. Head 182 of pin 180 extends through cavity wall 190 and contacts the surface of the ball at a normal angle. Head 182 is in the normal shape of a dimple and forms a dimple in the golf ball. Gate 170 is located at the pole of the half cup mold. Dimples 192 are shown on the inside of cavity wall 190. Preferably, pin 180 moves back about 0.125 inches (0.32 cm) to open gate 170 and allow fluid cover stock 176 to flow through gate 170 thereby acting as a valve. Gate 170 preferably has a diameter of about 0.15 inch (0.38 cm). It should be noted that gate 170 is about five times larger than conventional retractable mold gates. Having such a large gate accelerates the overall molding process.

Figure 6:
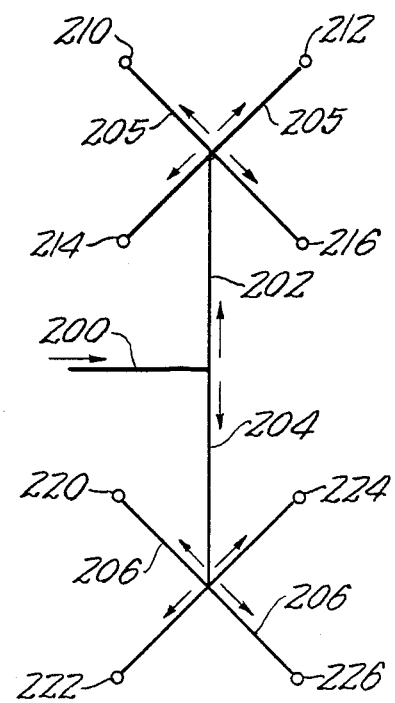
FIG. 6 illustrates a preferred flow pattern for fluid cover stock through the mold frame.

FIG. 6 illustrates the preferred flow patterns for fluid cover stock in a mold plate having 8 cavities therein. Fluid cover stock passes through runner 200 to arms 202 and 204, then through arms 202 and 204 to fingers 205 and 206, respectively. Finally, the fluid cover stock passes to gates 210, 212, 214, 216, 220, 222, 224 and 226. In the hot runner system, runners 200, arms 202 and 204 and fingers 205 and 206 are insulated and heated to maintain the cover stock in a constant fluid state. Additionally, the gates are also heated as previously mentioned. It is clear that such a system will allow for more than the conventional eight (8) cavity systems. Hot runner systems are conventional.

It will be understood that the claims are intended to cover all changes and modifications of the preferred embodiment of the invention herein chosen for the purpose of illustration which do not constitute a departure from the spirit and scope of the invention.

What is claimed is:

1. In a golf ball retractable pin mold having a top mold plate having a plurality of top half molds therein and a bottom mold plate having a plurality of bottom half molds therein, said plurality of top half molds in said top plate in registration with said plurality of bottom half molds in said bottom mold plate and each of said top and bottom half molds forming a substantially spherically shaped mold cavity, each of said top half molds and said bottom half molds joining at the equator of the spherically shaped mold cavity, the improvement comprising:
 (a) a gate positioned at the pole of each top half mold and at the pole of each bottom half mold; and
 (b) a valve at each gate to control the flow of fluid into each spherical shaped mold cavity.

2. The golf ball retractable pin mold of claim 1 wherein retractable pins are mounted in said mold plates such that the pins are normal to the surface of the golf ball.